United States Patent
Kim et al.

(10) Patent No.: US 11,646,431 B2
(45) Date of Patent: May 9, 2023

(54) HUMIDIFIER FOR FUEL CELL

(71) Applicants: Hyundai Motor Company, Seoul (KR); Kia Motors Corporation, Seoul (KR); Kolon Industries, Inc., Seoul (KR)

(72) Inventors: Hyun Yoo Kim, Seoul (KR); Woong Jeon Ahn, Seoul (KR); Young Seok Oh, Seoul (KR); Kyoung Ju Kim, Seoul (KR)

(73) Assignees: Hyundai Motor Company, Seoul (KR); Kia Motors Corporation, Seoul (KR); Kolon Industries, Inc., Seoul (KR)

( * ) Notice: Subject to any disclaimer, the term of this patent is extended or adjusted under 35 U.S.C. 154(b) by 381 days.

(21) Appl. No.: 16/928,738

(22) Filed: Jul. 14, 2020

(65) Prior Publication Data

US 2021/0050607 A1     Feb. 18, 2021

(30) Foreign Application Priority Data

Aug. 14, 2019     (KR) .......................... 10-2019-0099411

(51) Int. Cl.
   *H01M 8/04119*     (2016.01)
   *H01M 8/04089*     (2016.01)

(52) U.S. Cl.
   CPC ... *H01M 8/04149* (2013.01); *H01M 8/04104* (2013.01)

(58) Field of Classification Search
   CPC .................. H01M 8/04149; H01M 8/04104
   USPC .................................. 261/63, 102, 104, 105
   See application file for complete search history.

(56) References Cited

U.S. PATENT DOCUMENTS

| | | | |
|---|---|---|---|
| 7,985,279 B2 | 7/2011 | Kondo et al. | |
| 8,968,944 B2 | 3/2015 | Altmueller et al. | |
| 10,862,144 B2* | 12/2020 | Kim | H01M 8/04843 |
| 10,862,145 B2* | 12/2020 | Oh | H01M 8/04141 |
| 2007/0122669 A1* | 5/2007 | Kusano | H01M 8/249 |
| | | | 429/437 |
| 2009/0121366 A1 | 5/2009 | Leister et al. | |
| 2015/0050572 A1 | 2/2015 | Usuda et al. | |
| 2015/0107453 A1 | 4/2015 | Usuda et al. | |

(Continued)

FOREIGN PATENT DOCUMENTS

| | | |
|---|---|---|
| JP | 2005108436 A | 4/2005 |
| JP | 2006012617 A | 1/2006 |

(Continued)

*Primary Examiner* — Charles S Bushey
(74) *Attorney, Agent, or Firm* — Fox Rothschild LLP (57) ABSTRACT

A humidifier for a fuel cell is provided and includes a housing having, at a first side, a moist air supply port through which moist air is supplied from a fuel cell stack and having, at a second side, a moist air discharge port. A humidifying membrane is disposed in the housing and allows dry air to flow along the inside of the humidifying membrane. A bypass flow path is formed in the housing to allow a part of the moist air supplied to the moist air supply port to continuously flow to the moist air discharge port without passing through the humidifying membrane, thereby adjusting the amount of humidification and a differential pressure of the humidifier based on an operating condition of a fuel cell.

8 Claims, 6 Drawing Sheets

(56) References Cited

U.S. PATENT DOCUMENTS

| | | | |
|---|---|---|---|
| 2015/0295258 A1* | 10/2015 | Knies | H01M 8/04149 |
| | | | 429/413 |
| 2016/0036073 A1 | 2/2016 | Kim et al. | |
| 2017/0077531 A1 | 3/2017 | Kim et al. | |
| 2021/0111420 A1* | 4/2021 | Ahn | B01D 63/02 |

FOREIGN PATENT DOCUMENTS

| | | | |
|---|---|---|---|
| JP | 2008078018 A | 4/2008 | |
| JP | 2009289580 A | 12/2009 | |
| JP | 2010071618 A | 4/2010 | |
| KR | 1020100057105 A | 5/2010 | |
| KR | 2018-0048003 A | 5/2018 | |
| KR | 101896323 B1 | 9/2018 | |
| WO | 2005110581 A1 | 11/2005 | |
| WO | 2013137310 A1 | 9/2013 | |
| WO | 2013137313 A1 | 9/2013 | |
| WO | 2018182178 A1 | 10/2018 | |
| WO | 2018230566 A1 | 12/2018 | |

* cited by examiner

HUMIDIFIER FOR FUEL CELL

CROSS-REFERENCE TO RELATED APPLICATIONS

This application claims priority to and the benefit of Korean Patent Application No. 10-2019-0099411 filed on Aug. 14, 2019, the entire contents of which are incorporated herein by reference.

TECHNICAL FIELD

The present disclosure relates to a humidifier for a fuel cell, and more particularly, to a humidifier for a fuel cell, which adjusts the amount of humidification and a differential pressure of the humidifier based on an operating condition of a fuel cell.

BACKGROUND

A fuel cell system refers to a system that continuously produces electrical energy by a chemical reaction of continuously supplied fuel. Research and development are consistently performed regarding the fuel cell system as an alternative capable of solving global environmental issues.

Based on types of electrolytes used for the fuel cell system, the fuel cell system may be classified into a phosphoric acid fuel cell (PAFC), a molten carbonate fuel cell (MCFC), a solid oxide fuel cell (SOFC), a polymer electrolyte membrane fuel cell (PEMFC), an alkaline fuel cell (AFC), a direct methanol fuel cell (DMFC), and the like. Based on operating temperatures, output ranges, and the like as well as types of used fuel, the fuel cell systems may be applied to various application fields related to mobile power, transportation, distributed power generation, and the like. Among the fuel cells, the polymer electrolyte membrane fuel cell is applied to the field of a hydrogen vehicle (hydrogen fuel cell vehicle) being developed to substitute for an internal combustion engine.

The hydrogen vehicle is configured to produce electricity by a chemical reaction between hydrogen and oxygen and to travel by operating a motor. More specifically, the hydrogen vehicle includes a hydrogen tank ($H_2$ tank) configured to store hydrogen ($H_2$), a fuel cell configured to produce electricity by an oxidation-reduction reaction between hydrogen and oxygen ($O_2$), various types of devices configured to discharge produced water, a battery configured to store the electricity produced by the fuel cell, a controller configured to convert and adjust the produced electricity, and a motor configured to generate driving power.

Meanwhile, an electrolyte membrane of a membrane electrode assembly needs to be maintained at a predetermined humidity or higher to normally operate the fuel cell, and thus inflow gas may be humidified by a humidifier before being introduced into the fuel cell. Recently, a method of humidifying inflow gas (e.g., dry air), which passes through the humidifier, using moist air discharged from the fuel cell has been proposed. In addition, a degree of humidification (e.g., the amount of humidification) of the inflow gas to be introduced into the fuel cell needs to be adjustable based on an operating condition (or a humidified state) of the fuel cell.

However, in the related art, a separate bypass flow path is provided outside the humidifier, and the humidity of the fuel cell needs to be adjusted by introducing the inflow gas (e.g., humidified by the humidifier) into the fuel cell or by introducing the inflow gas directly into the fuel cell through the bypass flow path provided outside the humidifier without allowing the inflow gas to pass through the humidifier. Accordingly, the structure is complex, a degree of design freedom and spatial utilization deteriorate, and it is difficult to accurately adjust the amount of humidification of the inflow gas based on the operating condition of the fuel cell.

Further, the amount of humidification of the inflow gas may be increased as a humidification performance of the humidifier is improved. However, in the related art, as the amount of humidification of the inflow gas is increased, a differential pressure of the humidifier (e.g., a pressure difference between an inlet and an outlet of the humidifier) is increased, which causes a deterioration in energy efficiency (e.g., an increase in power consumption). Furthermore, in the related art, excessively humidified inflow gas is consistently supplied to the fuel cell, which causes flooding in the fuel cell.

Therefore, recently, various types of research are conducted on a humidifier for a fuel cell capable of adjusting the differential pressure of the humidifier while adjusting the amount of humidification of the inflow gas based on the operating condition of the fuel cell stack, but the research result is still insufficient. Accordingly, there is a need for further development of the humidifier.

SUMMARY

The present disclosure provides a humidifier for a fuel cell, which is capable of adjusting the amount of humidification and a differential pressure of the humidifier based on an operating condition of a fuel cell. The present disclosure also minimizes a deterioration in energy efficiency caused by an increase in differential pressure of a humidifier and inhibits flooding in a fuel cell caused by excessive humidification. The present disclosure also simplifies a structure and improves a degree of design freedom and spatial utilization.

In order to achieve the above-mentioned objects of the present disclosure, an exemplary embodiment of the present disclosure provides a humidifier for a fuel cell that may include: a housing having, at a first side, a moist air supply port through which moist air may be supplied from a fuel cell stack and having, at a second side, a moist air discharge port; and a humidifying membrane disposed in the housing and configured to allow dry air to flow along the inside of the humidifying membrane, in which a bypass flow path is formed in the housing to allow a part of the moist air supplied to the moist air supply port to always flow to the moist air discharge port without passing through the humidifying membrane.

This configuration adjusts the amount of humidification and a differential pressure of the humidifier based on an operating condition of a fuel cell. In other words, in the related art, as the amount of inflow gas humidified by the humidifier is increased, a differential pressure of the humidifier (e.g., a pressure difference between an inlet and an outlet of the humidifier) is increased, which causes a deterioration in energy efficiency (an increase in power consumption). In addition, excessively humidified inflow gas is consistently supplied to the fuel cell (e.g., during a low-output operation of the fuel cell), which causes flooding in the fuel cell.

However, according to the present disclosure, since a part of the moist air supplied into the housing through the moist air supply port is allowed to consistently flow to the moist air discharge port without passing through the humidifying membrane, it may be possible to inhibit an excessive increase in differential pressure of the humidifier and thus minimize a deterioration in energy efficiency caused by the increase in differential pressure of the humidifier. In addition, the amount of dry air humidified may be reduced since a part of the moist air supplied into the housing is allowed to flow to the moist air discharge port without passing through the humidifying membrane, and as a result, it may be possible to prevent flooding caused by excessive humidification during a low-output operation of the fuel cell stack.

More specifically, the housing may include: a housing main body configured to receive therein the humidifying membrane and having a first flow path wall disposed above the humidifying membrane; and a housing cap having a second flow path wall disposed above the first flow path wall to be spaced apart from the first flow path wall, the housing cap being coupled to an upper portion of the housing main body, and the first flow path wall and the second flow path wall may define the bypass flow path in cooperation with each other.

A cross-sectional area of the bypass flow path may be selectively changed. A bypass flow rate of the moist air flowing through the bypass flow path, which is a part of the moist air supplied into the housing, may be selectively adjusted by selectively changing the cross-sectional area of the bypass flow path as described above, as a result of which it may be possible to adjust the amount of humidification of the humidified air and the differential pressure of the humidifier based on an operating condition or a humidified state of the fuel cell stack. The cross-sectional area of the bypass flow path may be changed in various ways in accordance with required conditions and design specifications.

The housing cap may include: a first cap member configured to be coupled to the housing main body and having the second flow path wall disposed at a first height (H1) with respect to the first flow path wall; and a second cap member configured to be coupled to the housing main body and having the second flow path wall disposed at a second height (H2) different from the first height (H1). The cross-sectional area of the bypass flow path may be changed by coupling any one of the first cap member and the second cap member to the housing main body.

The humidifier for a fuel cell may include a first partition wall member having a first size (L1) and configured to partially block the bypass flow path, and a second partition wall member having a second size (L2) different from the first size (L1) and configured to partially block the bypass flow path. The cross-sectional area of the bypass flow path may be changed by disposing any one of the first partition wall member and the second partition wall member in the bypass flow path.

As still another example, the humidifier for a fuel cell may include a blocking member configured to partially open or close the bypass flow path; and a controller configured to open or close the blocking member based on humidity of the fuel cell stack, in which the cross-sectional area of the bypass flow path may be changed by opening or closing the blocking member.

For example, the blocking member may be coupled to the second flow path wall to be movable upward and downward (e.g., vertically), the humidifier may include a lifting unit configured to selectively move the blocking member vertically, and the controller may be configured to operate the lifting unit based on humidity of the fuel cell stack. In particular, the controller may be configured to decrease the cross-sectional area of the bypass flow path by moving the blocking member downward when the humidity of the fuel cell stack is less than a target humidity range, and the controller may be configured to increase the cross-sectional area of the bypass flow path by moving the blocking member upward when the humidity of the fuel cell stack is greater than the target humidity range.

BRIEF DESCRIPTION OF THE DRAWINGS

The above and other features of the present disclosure will now be described in detail with reference to exemplary embodiments thereof illustrated the accompanying drawings which are given hereinbelow by way of illustration only, and thus are not limitative of the present disclosure, and wherein.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below. Notably, the controller may be specifically programmed to execute the processes described herein.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings, but the present disclosure is not restricted or limited by the exemplary embodiments. For reference, like reference numerals denote substantially identical elements in the present description, the description may be made under this rule by incorporating the contents illustrated in other drawings, and the contents repeated or determined as being obvious to those skilled in the art may be omitted.

Referring to FIGS. 1 to 6, a humidifier 100 for a fuel cell according to the present disclosure may include: a housing 110 having, at a first side, a moist air supply port 112 through which moist air may be supplied from a fuel cell stack 200 and having, at a second side, a moist air discharge port 114; and humidifying membranes 140 disposed in the housing 110 and configured to allow dry air to flow along the inside of the humidifying membranes 140, and a bypass flow path 111 may be formed in the housing 110 to allow a part of the moist air supplied to the moist air supply port 112 to always or continuously flow to the moist air discharge port 114 without passing through the humidifying membrane 140.

The humidifier 100 for a fuel cell according to the present disclosure may be configured to humidify inflow gas (e.g., air) to be introduced into the fuel cell stack 200. For reference, the fuel cell stack 200 may have various structures capable of producing electricity by an oxidation-reduction reaction between fuel (e.g., hydrogen) and an oxidant (e.g., air).

As an example, the fuel cell stack 200 may include: a membrane electrode assembly (MEA) (not illustrated) having catalyst electrode layers, in which electrochemical reactions occur, at both sides of an electrolyte membrane through which hydrogen ions move; gas diffusion layers (GDL) (not illustrated) configured to uniformly distribute reactant gases and serve to transfer generated electrical energy; a gasket (not illustrated) and a fastener (not illustrated) configured to maintain leakproof sealability for the reactant gases and a coolant and maintain an appropriate fastening pressure; and a separator (bipolar plate) (not illustrated) configured to move the reactant gases and the coolant.

More specifically, in the fuel cell stack 200, hydrogen, which is fuel, and air (oxygen), which is an oxidant, are supplied to an anode and a cathode of the membrane electrode assembly, respectively, through flow paths in the separator, such that the hydrogen is supplied to the anode, and the air is supplied to the cathode. The hydrogen supplied to the anode is decomposed into hydrogen ions (protons) and electrons by catalysts in the electrode layers provided at both sides of the electrolyte membrane. Only the hydrogen ions are selectively delivered to the cathode through the electrolyte membrane which is a positive ion exchange membrane, and at the same time, the electrons are delivered to the cathode through the gas diffusion layer and the separator which are conductors.

At the cathode, the hydrogen ions supplied through the electrolyte membrane and the electrons delivered through the separator meet oxygen in the air supplied to the cathode by an air supply device to generate a reaction of producing water. Due to the movement of the hydrogen ions, the electrons flow through external conductive wires, and an electric current is produced due to the flow of the electrons.

Further, the housing 110 may include a predetermined receiving space therein. The housing 110 may be variously changed in shape and structure in accordance with required conditions and design specifications, but the present disclosure is not restricted or limited by the shape and the structure of the housing 110. As an example, the housing 110 may be formed in the form of a quadrangular box having therein a receiving space.

A dry air supply port (not illustrated), through which dry air is supplied, may be formed at a first side of the housing 110, and a dry air discharge port (not illustrated), through which dry air is discharged, may be formed at a second side of the housing 110. As an example, based on FIG. 1, the dry air supply port (not illustrated), through which the dry air is supplied, may be formed at a right end of the housing 110, and the dry air discharge port (not illustrated) may be formed at a left end of the housing 110.

For reference, the dry air supplied to the dry air supply port may be humidified while passing through the humidifying membranes 140, and the humidified air (made by humidifying the dry air) discharged through the dry air discharge port may be supplied to the fuel cell stack 200. In addition, the moist air supply port 112 may be formed at a first side (e.g., a left upper end based on FIG. 1) of the housing 110, and the moist air discharge port 114 is formed at a second side (e.g., a right upper end based on FIG. 1) of the housing 110.

The moist air (or produced water) discharged from the fuel cell stack 200 may be introduced into the housing 110 along a connecting flow path (not illustrated) that connects the fuel cell stack 200 and the moist air supply port 112 of the housing 110. The dry air, which flows along the humidifying membranes 140, may be humidified by using the humid and moist air in the housing 110. The humidifying membranes 140 may be disposed in the housing 110 and configured to allow the dry air to flow along the inside of the humidifying membranes 140. As an example, the humidifying membrane 140 may be formed as a hollow fiber membrane in the form of a tube in which the dry air may flow, and a first end (e.g., an inlet end) and a second end (e.g., an outlet end) of the humidifying membrane 140 are fixed in the housing 110 by a potting material 142.

For reference, since the humidifying membrane 140 is formed as a hollow fiber membrane, moisture supplied into the housing 110 (e.g., moisture in the moist air) may penetrate into the humidifying membrane 140 from the outside of the humidifying membrane 140 and then be transferred to the dry air. However, the dry air is unable to penetrate the humidifying membrane 140 from the inside of the humidifying membrane 140 to the outside of the humidifying membrane 140. In addition, the bypass flow path 111 may be formed in the housing 110, and the bypass flow path 111 allows a part of the moist air supplied to the moist air supply port 112 to always or continuously flow to the moist air discharge port 114 without passing through the humidifying membrane 140.

Since a part of the moist air supplied into the housing 110 continuously flows to the moist air discharge port 114 as described above, it may be possible to obtain an advantageous effect of inhibiting an excessive increase in differential pressure of the humidifier 100 and thus reducing the power consumption caused by the increase in differential pressure. In addition, the amount of humidification of the dry air may be reduced since a part of the moist air supplied into the housing 110 is allowed to flow to the moist air discharge port 114 without passing through the humidifying membrane 140, and as a result, it may be possible to obtain an advantageous effect of preventing flooding caused by excessive humidification during a low-output operation of the fuel cell stack 200.

More specifically, the housing 110 may include a housing main body 120 configured to receive therein the humidifying membranes 140 and having a first flow path wall 122 disposed above the humidifying membranes 140, and a housing cap 130 having a second flow path wall 132 disposed above the first flow path wall 122 to be spaced apart from the first flow path wall 122, the housing cap 130 being coupled to an upper portion of the housing main body 120. The first flow path wall 122 and the second flow path wall 132 define the bypass flow path 111 in cooperation with each other. In particular, the expression "the first flow path wall 122 and the second flow path wall 132 define the bypass flow path 111 in cooperation with each other" indicates that a part of a wall surface of the bypass flow path 111 is defined by the first flow path wall 122 and the remaining wall surface of the bypass flow path 111 is defined by the second flow path wall 132.

As an example, a bottom surface of the bypass flow path 111 may be defined by the first flow path wall 122, and a ceiling surface of the bypass flow path 111 may be defined by the second flow path wall 132. According to another exemplary embodiment of the present disclosure, a first extension wall (not illustrated) may be formed to be bent upward from a lateral end of the first flow path wall, and a second extension wall (not illustrated) may be formed to be bent downward from a lateral end of the second flow path wall, and both sides of the bypass flow path may be defined by the first extension wall and the second extension wall.

For reference, a part of the moist air introduced into the housing 110 through the moist air supply port 112 flows along the bypass flow path 111 and then may be discharged immediately to the outside of the housing 110 through the moist air discharge port 114. The remaining part of the moist air introduced into the housing 110 through the moist air supply port 112 may flow along a humidification flow path (e.g., a lower space (not illustrated) of the bypass flow path based on FIG. 1) passing through the humidifying membranes 140 and then may be discharged to the outside of the housing 110 through the moist air discharge port 114. In particular, a cross-sectional area of the bypass flow path 111 may be selectively changed.

As described above, a bypass flow rate of the moist air flowing through the bypass flow path 111, which is a part of the moist air supplied into the housing 110, may be selectively adjusted by selectively changing the cross-sectional area of the bypass flow path 111 as described above, as a result of which it may be possible to adjust the amount of humidification of the humidified air and the differential pressure of the humidifier 100 based on an operating condition or a humidified state of the fuel cell stack 200.

This is due to the fact that the amount of humidification of the humidified air and the differential pressure of the humidifier 100 may be adjusted by controlling the bypass flow rate of the moist air that flows through the bypass flow path 111. For example, as the cross-sectional area of the bypass flow path 111 is decreased (e.g., reduced), the bypass flow rate of the moist air flowing through the bypass flow path 111 may be decreased, whereas a flow rate of the moist air flowing along the humidification flow path may be increased.

When the flow rate of the moist air flowing along the humidification flow path is increased, the amount of humidification of the humidified air may be increased, which improves the performance of the fuel cell stack 200. However, the differential pressure of the humidifier 100 (e.g., a pressure difference between the inlet and the outlet of the housing 110) may be increased, which causes an increase in power consumption. On the contrary, as the cross-sectional area of the bypass flow path 111 is increased (enlarged), the bypass flow rate of the moist air flowing through the bypass flow path 111 may be increased, whereas the flow rate of the moist air flowing through the humidification flow path may be decreased.

When the flow rate of the moist air flowing along the humidification flow path is decreased, the differential pressure of the humidifier 100 may be decreased, which decreases the power consumption. However, the amount of humidification of the humidified air is decreased, which causes a deterioration in performance of the fuel cell stack 200. Therefore, it may be possible to adjust the amount of humidification of the humidified air and the differential pressure of the humidifier 100 based on the operating condition or the humidified state of the fuel cell stack 200 by selectively changing the cross-sectional area of the bypass flow path 111.

The cross-sectional area of the bypass flow path 111 may be changed in various ways in accordance with required conditions and design specifications. As an example, the housing cap 130 may include a plurality of cap members having the second flow path walls 132 formed at different heights, and the cross-sectional area of the bypass flow path 111 may be changed by changing the cap members.

Figure 1:
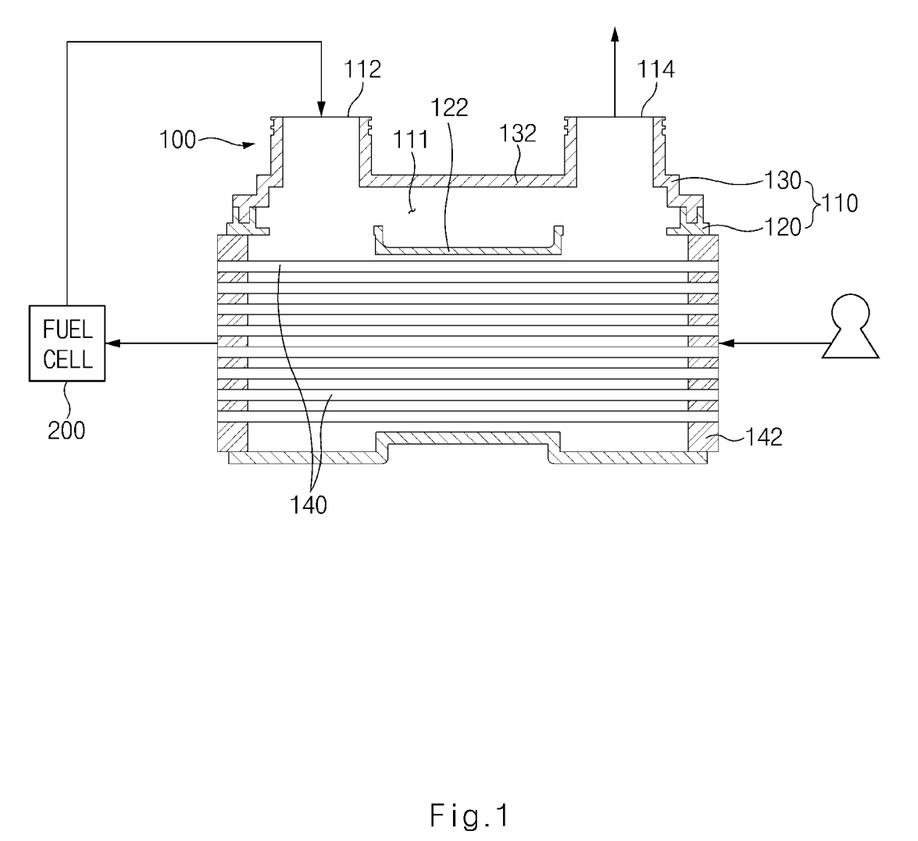
FIG. 1 is a view illustrating a fuel cell system to which a humidifier for a fuel cell according to an exemplary embodiment the present disclosure is applied.
Figure 2:
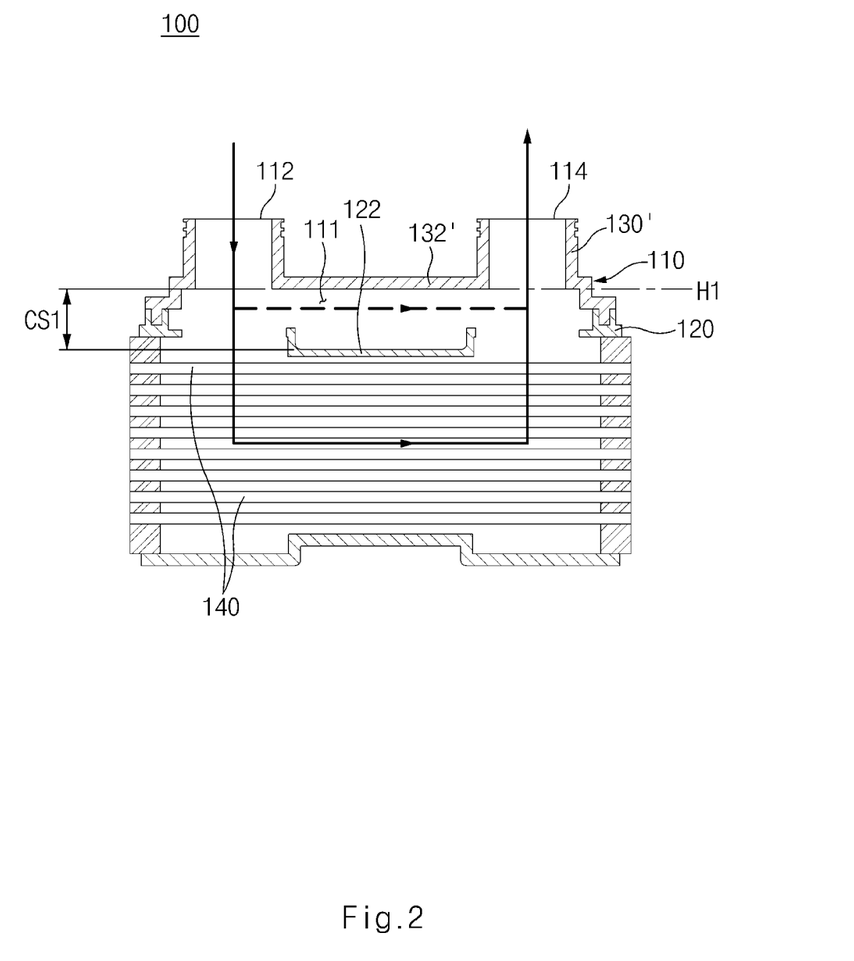
FIGS. 2 and 3 are views illustrating a humidifier for a fuel cell according to a first exemplary embodiment of the present disclosure.
Figure 3:
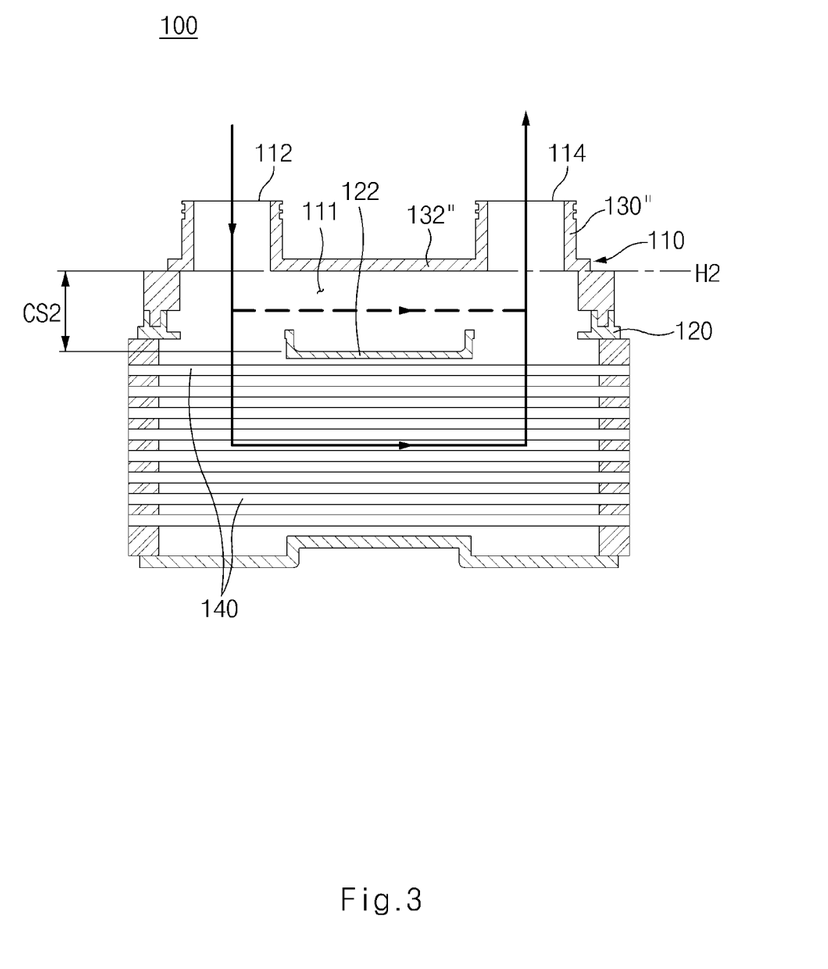

More specifically, referring to FIGS. 2 and 3, the housing cap 130 may include a first cap member 130' configured to be coupled to the housing main body 120 and having the second flow path wall 132 disposed at a first height H1 with respect to the first flow path wall 122, and a second cap member 130" configured to be coupled to the housing main body 120 and having the second flow path wall 132 disposed at a second height H2 different from the first height H1. The cross-sectional area of the bypass flow path 111 may be changed by coupling any one of the first cap member 130' and the second cap member 130" to the housing main body 120. More specifically, referring to FIG. 2, the second flow path wall 132 may be formed in the first cap member 130' to be disposed at the first height H1 with respect to the first flow path wall 122, and a cross-sectional area CS1 of the bypass flow path 111 may be determined by the first flow path wall 122 and the second flow path wall 132 disposed at the first height H1.

Referring to FIG. 3, the second flow path wall 132 may be formed in the second cap member 130" to be disposed at the second height H2 higher than the first height H1, and a cross-sectional area CS2 of the bypass flow path 111 may be determined by the first flow path wall 122 and the second flow path wall 132 disposed at the second height H2. Referring back to FIGS. 2 and 3, when the second cap member 130" is coupled to the housing main body 120, the cross-sectional area of the bypass flow path 111 may be increased (CS2>CS1) compared to the configuration in which the first cap member 130' is coupled to the housing main body 120. On the contrary, when the first cap member 130' is coupled to the housing main body 120, the cross-sectional area of the bypass flow path 111 may be decreased (CS1<CS2) compared to the configuration in which the second cap member 130" is coupled to the housing main body 120.

In the exemplary embodiment of the present disclosure described and illustrated above, examples have been described in which the cross-sectional areas of the bypass flow path 111 are changed by using the two cap members having the second flow path walls 132 formed at the different heights. However, according to another exemplary embodiment of the present disclosure, the cross-sectional area of the bypass flow path may be changed by using three or more cap members having second flow path walls formed at different heights. As another example, the humidifier 100 for a fuel cell may include a plurality of partition wall members having different sizes and configured to partially block the bypass flow path 111. The cross-sectional area of the bypass flow path 111 may be adjusted by changing the partition wall members.

Figure 4:
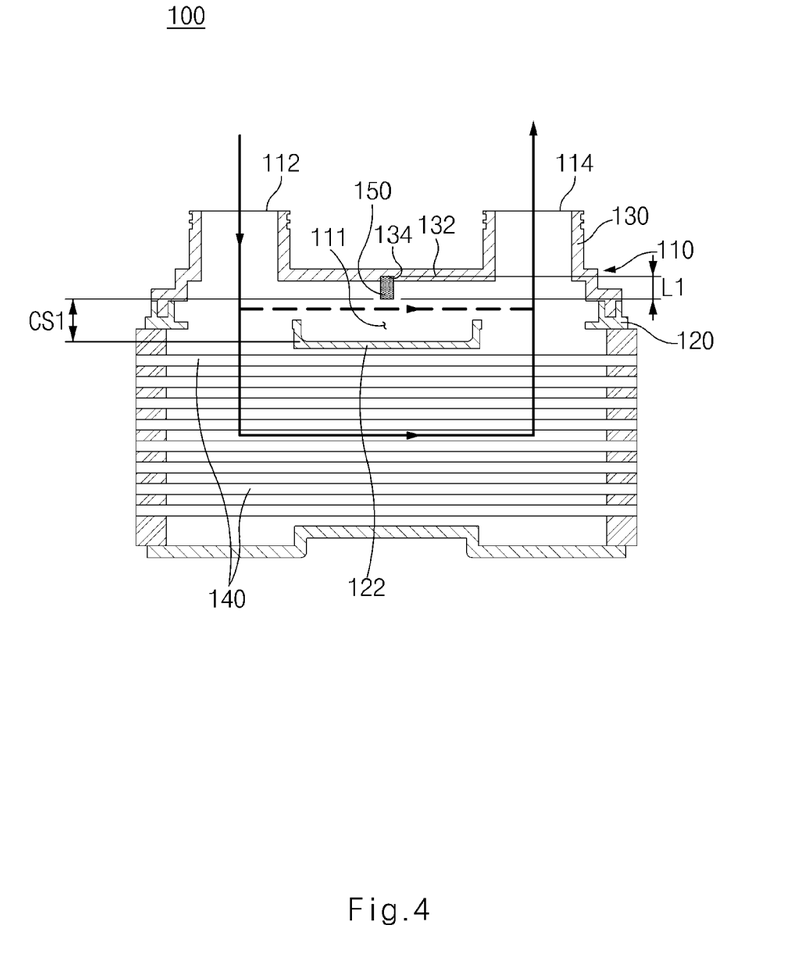
FIGS. 4 and 5 are views illustrating a humidifier for a fuel cell according to a second exemplary embodiment of the present disclosure.
Figure 5:
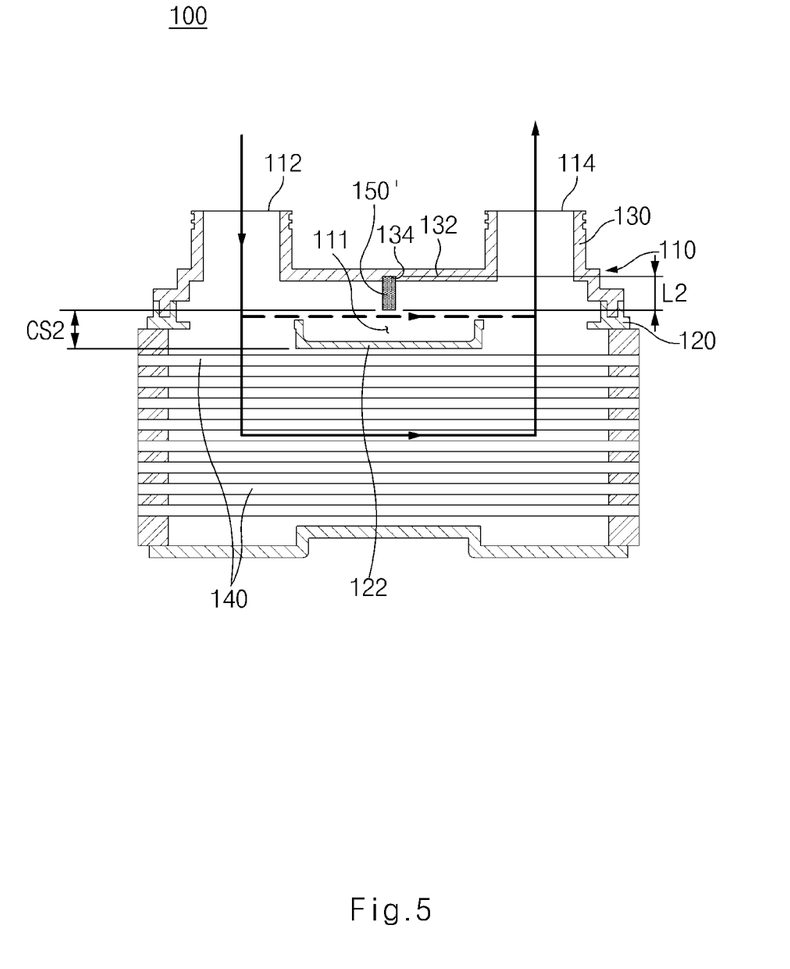

More specifically, referring to FIGS. 4 and 5, the humidifier 100 for a fuel cell may include a first partition wall member 150 having a first size L1 and configured to partially block the bypass flow path 111, and a second partition wall member 150' having a second size L2 different from the first size L1 and configured to partially block the bypass flow path 111. The cross-sectional area of the bypass flow path 111 may be adjusted by disposing any one of the first partition wall member 150 and the second partition wall member 150' in the bypass flow path 111. For reference, in the present disclosure, the expression "the first partition wall member 150 and the second partition wall member 150' have different sizes" indicates that the first partition wall member 150 and the second partition wall member 150' are different from each other in terms of one or more of length, width, height, and area.

Referring to FIG. 4, the first partition wall member 150 has the first size L1 and may be disposed in the bypass flow path 111 to partially block the bypass flow path 111, and the cross-sectional area CS1 of the bypass flow path 111 may be determined by the first flow path wall 122 (or the second flow path wall) and the first partition wall member 150 having the first size L1. As an example, a coupling groove 134 may be formed in an inner surface of the second flow path wall 132, and the first partition wall member 150 may be coupled to the coupling groove 134 to partially block the bypass flow path 111.

Referring to FIG. 5, the second partition wall member 150' has the second size L2 greater than the first size L1, and the cross-sectional area CS2 of the bypass flow path 111 may be determined by the second partition wall member 150' and the first flow path wall 122 (or the second flow path wall). As an example, the coupling groove 134 may be formed in the inner surface of the second flow path wall 132, and the second partition wall member 150' may be coupled to the coupling groove 134 to partially block the bypass flow path 111.

Referring back to FIGS. 4 and 5, when the second partition wall member 150' is coupled to the second flow path wall 132, the cross-sectional area of the bypass flow path 111 may be increased (CS2>CS1) compared to the configuration in which the first partition wall member 150 is coupled to the second flow path wall 132. On the contrary, when the first partition wall member 150 is coupled to the second flow path wall 132, the cross-sectional area of the bypass flow path 111 may be decreased (CS1<CS2) compared to the configuration in which the second partition wall member 150' is coupled to the second flow path wall 132.

In the exemplary embodiment of the present disclosure described and illustrated above, examples have been described in which the cross-sectional areas of the bypass flow path 111 are changed by using the two partition wall members having different sizes. However, according to another exemplary embodiment of the present disclosure, the cross-sectional area of the bypass flow path may be changed by using three or more partition wall members having different sizes.

As another example, the humidifier 100 for a fuel cell may include a blocking member 160 configured to partially open or close the bypass flow path 111, and the cross-sectional area of the bypass flow path 111 may be changed by opening or closing the blocking member 160. More specifically, referring to FIG. 6, the humidifier 100 for a fuel cell may include the blocking member 160 configured to partially open or close the bypass flow path 111, and a controller 180 configured to execute an operation of opening or closing the blocking member 160 based on humidity of the fuel cell stack 200, and a cross-sectional area ΔCS of the bypass flow path 111 may be changed by opening or closing the blocking member 160.

Figure 6:
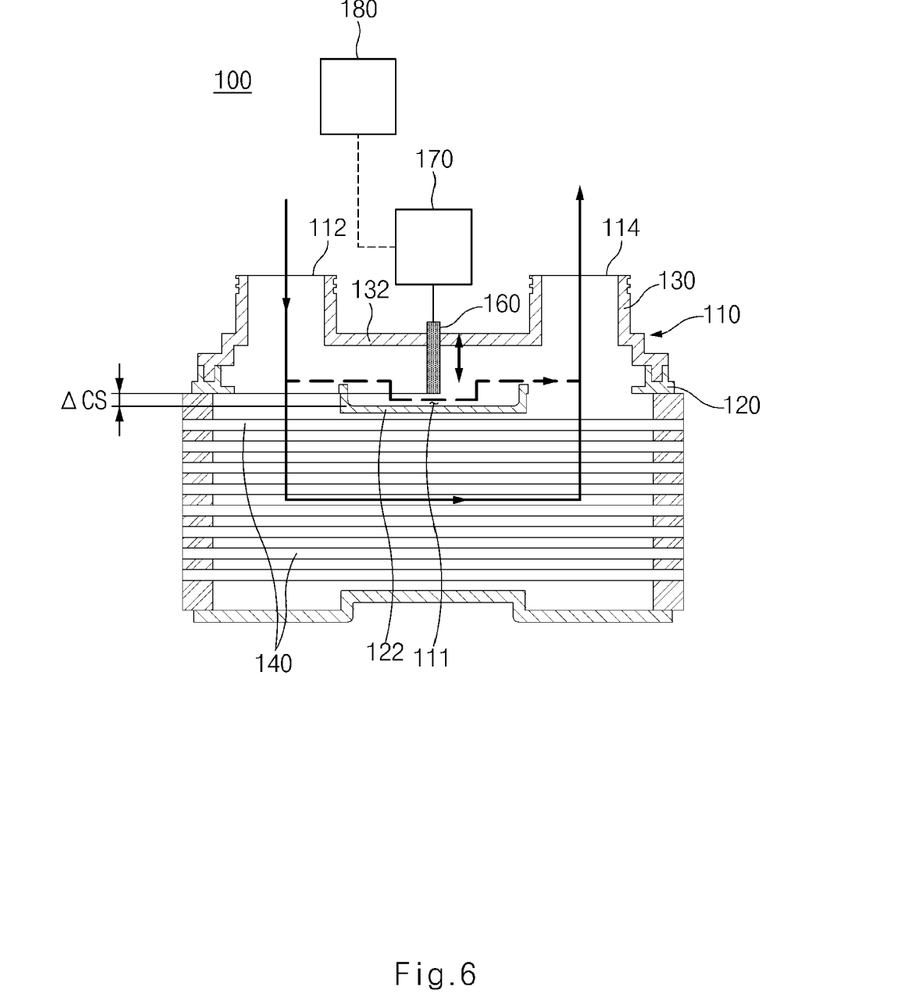
FIG. 6 is a view illustrating a humidifier for a fuel cell according to a third exemplary embodiment of the present disclosure.

As an example, the blocking member 160 may be coupled to the second flow path wall 132 to be movable upward and downward, and the humidifier 100 for a fuel cell may include a lifting unit 170 configured to selectively move the blocking member 160 upward or downward. The controller 180 may be configured to operate the lifting unit 170 based on the humidity of the fuel cell stack 200. The blocking member 160 may be coupled to the second flow path wall 132 to be movable upward and downward or vertically, and the bypass flow path 111 may be partially blocked to the extent that the blocking member 160 is moved upward or downward and thus may protrude from the inner surface of the second flow path wall 132 (to open or close the bypass flow path 111).

The lifting unit 170 may have various structures capable of moving the blocking member 160 vertically, and the present disclosure is not restricted or limited by the structure of the lifting unit 170 and a method of moving the blocking member 160 vertically. As an example, the lifting unit 170 may be configured to move the blocking member 160 vertically by a lead screw configured to be rotated by a motor. According to another exemplary embodiment of the present disclosure, the lifting unit may be configured to move the blocking member vertically by a linear motor, a solenoid, or the like.

The controller 180 may be configured to operate the lifting unit 170 based on the humidity of the fuel cell stack 200, and the controller 180 may be configured to adjust whether to move the blocking member 160 upward or downward and adjust a height by which the blocking member 160 is moved upward or downward. As an example, when the humidity of the fuel cell stack 200 is less than a target humidity range (e.g., a low humidified state), the controller 180 may be configured to decrease the cross-sectional area of the bypass flow path 111 by moving the blocking member 160 downward. When the humidity of the fuel cell stack 200 is greater than the target humidity range (e.g., an excessively humidified state), the controller 180 may be configured to increase the cross-sectional area of the bypass flow path 111 by moving the blocking member 160 upward. Further, when the humidity of the fuel cell stack 200 is within the target humidity range, the operation of moving the blocking member 160 upward or downward may be stopped. The controller 180 of the apparatus according to an exemplary embodiment of the present disclosure may be a processor (e.g., computer, microprocessor, CPU, ASIC, circuitry, logic circuits, etc.).

In the exemplary embodiment of the present disclosure described and illustrated above, there has been described the example in which the cross-sectional area of the bypass flow path 111 is changed by moving the blocking member 160 upward or downward. However, according to another exemplary embodiment of the present disclosure, the blocking member may be configured to partially open or close the bypass flow path like an aperture of a camera or like a hinged door to change the cross-sectional area of the bypass flow path.

According to the present disclosure as described above, it may be possible to obtain an advantageous effect of adjusting the amount of humidification and the differential pressure of the humidifier based on the operating condition of the fuel cell. In particular, according to the present disclosure, it may be possible to obtain an advantageous effect of minimizing a deterioration in energy efficiency caused by an increase in differential pressure of the humidifier. In addition, according to the present disclosure, it may be possible to obtain an advantageous effect of inhibiting flooding in the fuel cell caused by excessive humidification. According to the present disclosure, it may also be possible to obtain an advantageous effect of simplifying the structure and improving the degree of design freedom and the spatial utilization.

While the present disclosure has been described above with reference to the exemplary embodiments, it may be understood by those skilled in the art that the present disclosure may be variously modified and changed without departing from the spirit and scope of the present disclosure disclosed in the claims.

What is claimed is:

1. A humidifier for a fuel cell, the humidifier, comprising:
   a housing having, at a first side, a moist air supply port through which moist air is supplied from a fuel cell stack and having, at a second side, a moist air discharge port;
   a humidifying membrane disposed in the housing and configured to allow dry air to flow along the inside of the humidifying membrane; and
   a bypass flow path formed in the housing to allow a part of the moist air supplied to the moist air supply port to continuously flow to the moist air discharge port without passing through the humidifying membrane;
   wherein the housing further includes:
      a housing main body into which the humidifying membrane is inserted, the housing main body including a first flow path wall disposed above the humidifying membrane; and
      a housing cap having a second flow path wall disposed above the first flow path wall to be spaced apart from the first flow path wall, wherein the housing cap is coupled to an upper portion of the housing main body;
   wherein the first flow path wall and the second flow path wall define the bypass flow path in cooperation with each other.

2. The humidifier of claim 1, wherein a cross-sectional area of the bypass flow path is changed selectively.

3. The humidifier of claim 2, wherein the housing cap includes:
   a first cap member configured to be coupled to the housing main body and having the second flow path wall disposed at a first height with respect to the first flow path wall; and
   a second cap member configured to be coupled to the housing main body and having the second flow path wall disposed at a second height different from the first height,
   wherein the cross-sectional area of the bypass flow path is changed by coupling any one of the first cap member and the second cap member to the housing main body.

4. The humidifier of claim 2, further comprising:
   a first partition wall member having a first size and configured to partially block the bypass flow path; and
   a second partition wall member having a second size different from the first size and configured to partially block the bypass flow path,
   wherein the cross-sectional area of the bypass flow path is changed by disposing any one of the first partition wall member and the second partition wall member in the bypass flow path.

5. The humidifier of claim 4, wherein a coupling groove, to which the first partition wall member or the second partition wall member is coupled, is formed in any one of the first flow path wall and the second flow path wall.

6. The humidifier of claim 2, comprising:
   a blocking member configured to partially open or close the bypass flow path; and
   a controller configured to open or close the blocking member based on humidity of the fuel cell stack,
   wherein the cross-sectional area of the bypass flow path is changed by opening or closing the blocking member.

7. The humidifier of claim 6, wherein the blocking member is coupled to the second flow path wall to be movable upward and downward, the humidifier includes a lifting unit configured to selectively move the blocking member upward or downward, and the controller is configured to operate the lifting unit based on humidity of the fuel cell stack.

8. The humidifier of claim 7, wherein the controller is configured to decrease the cross-sectional area of the bypass flow path by moving the blocking member downward when the humidity of the fuel cell stack is less than a target humidity range, and wherein the controller is configured to increase the cross-sectional area of the bypass flow path by moving the blocking member upward when the humidity of the fuel cell stack is greater than the target humidity range.

* * * * *